Jan. 24, 1956 G. R. COUANAULT 2,732,520
ELECTRICAL SERVO-MECHANISMS
Filed Dec. 11, 1952

Inventor:
Georges René Couanault
Attorneys:
Baldwin & Wight

United States Patent Office 2,732,520
Patented Jan. 24, 1956

2,732,520

ELECTRICAL SERVO-MECHANISMS

Georges René Couanault, Vitry-sur-Seine, France, assignor to Societe Alsacienne de Constructions Mecaniques, Paris, France, a corporation of France Application December 11, 1952, Serial No. 325,411

Claims priority, application France December 18, 1951

6 Claims. (Cl. 318—18)

The present invention relates to servo-mechanisms in which an error signal, previously converted into an alternating current with a variable amplitude, is amplified in an amplifier chain of any known type, and supplies an associated two-phase motor, in which the stator comprises two windings, one of which is supplied by the amplified currents and the other one by a constant current at the same frequency.

Heretofore servo-mechanisms with a short response time and with a high precision have been used with an amplifier chain with a high gain and a wide frequency band. It is also known that it is necessary to use correcting devices for insuring the stability of the servo-mechanism, and also its precision when the stability conditions have been obtained.

According to a well known method, a voltage, proportional to the angular speed of rotation of the controlled motor, is re-applied at one point of the amplifier chain, in phase opposition with the directly amplified currents. Such an arrangement is equivalent to creating in the motor an additional resistant mechanical torque. A simple device in accordance with that method is obtained in using the counterelectro-motive force which appears at the input terminals of the motor when the latter is in operation, and to re-apply, at one point in the amplifier chain and in phase opposition, a voltage proportional to said counterelectro-motive force.

In any application of the known method, such as described above, it is necessary to pick up, at the input terminals of the motor, the counter-electro-motive force. To this effect, it is also known to insert, between the output terminals of the amplifier chain, a balanced Wheatstone bridge. This bridge comprises two impedances, in a given ratio, constituting bridge arms, and which may be replaced, in an equivalent manner, according to a known method, by a hybrid transformer. This bridge also comprises two other arms, one of which consists of the motor and the other one of an electrical network known as a "balancing network." Such a balancing network is used in such a manner that it provides, across its two input terminals, an impedance equal to that of the motor, divided by the ratio of the bridge arms.

The amplifier chain supplies the bridge through one of its diagonals, and the return path for the counterelectromotive force is placed along the other diagonal.

When the balanced condition for the bridge has been obtained, i. e. if the impedances of the motor and balancing network are exactly in the bridge arms ratio, no voltage related to the output voltage in the amplifier chain appears in the return path. If this balance is not obtained, a voltage proportional to the output voltage from the amplifier chain, inversely proportional to $$\frac{\Delta z}{Z}$$

Z and z+Δz being the impedances in the two arms, is re-applied, through the bridge and the return path, into the amplifier chain with a phase of any value. In this method a serious drawback occurs due to the effects of this extraneous reaction path which, in some cases, make it impossible to obtain the stability condition which is essential for the servo-mechanism.

In the known servo-mechanisms, only simple balancing networks have been used, such as, for example, a resistor. Now, in order to obtain, by this method, rapid and accurate servo-mechanisms, a more perfect balancing is necessary so as to make it possible to include, in the re-applied path of the counter-electro-motive force, a high amplification without the extraneous reaction jeopardizing the stability of the system.

In addition, among the effects which should be taken into account for the design of the balancing networks, the most important are the effects of non-proportionality between the voltage across the motor terminals and the current flowing through the motor, due to the iron in the magnetic circuit. A balancing network consisting in a network of linear impedances cannot provide a satisfactory balancing.

An object of this invention is to obviate the above mentioned drawbacks which are inherent to the devices known to date.

In a servo-mechanism of the controlled two-phase motor type and with a correction by negative reaction applied in the amplifier chain through a balanced Wheatstone bridge comprising two impedances in a given ratio and two arms, one of which consists of said motor and the other one of an electric balancing network, the object of the present invention lies in that said electric network comprises a magnetic circuit the material of which is of the same nature and composition as that of the magnetic circuit of said controlled motor, and in that said material is subjected to the same induction as that in said motor when the latter and said electric network are supplied with currents of the same magnitude.

A preferred example of an embodiment of such a balancing network, in the case ratio K of the bridge arms is different from unity, consists in making the magnetic circuit out of stampings of the same nature as those of the magnetic circuit in the motor to be balanced, and the volume of which is K times smaller than that of the motor, and in such a manner that the ratio of the air-gap lengths to the total length of the magnetic circuit be the same for the balancing circuit and for the motor.

Thus, the ratio K being of such a value that the apparent impedance of the balancing network is K times smaller than that of the motor, the power dissipated in the balancing network, which is located in the balanced bridge and passing the same current as the motor, is only the 1/Kth part of the power drawn by the motor and is thus reduced.

In case the ratio of the arms of the bridge is equal to unity, a balancing network for the controlled motor, according to the invention, may be an identical motor with its rotor immobilized.

The present invention will be described hereinafter in greater detail with reference to the appended drawings which illustrate an example of an embodiment of a device in accordance with the invention, and wherein.

Figure 1:
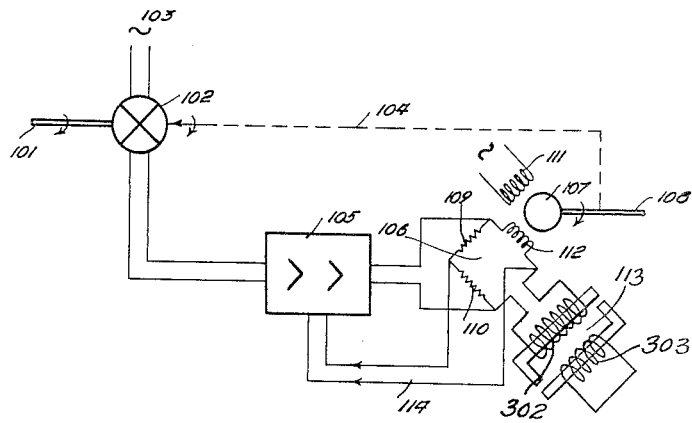
Fig. 1 represents a diagram of the principle of a servo-mechanism according to the invention.

The servo-mechanism represented in Fig. 1 is a servo-mechanism insuring the positioning of a rotating shaft. In that figure are shown an input shaft 101, an error discriminator 102 supplied at a constant frequency (say 50 C. P. S.) from a source 103 and having as a function to supply a current of the same frequency and with an amplitude proportional to the angular spacing between the input shaft 101 and a return shaft 104; the error signal, with a variable amplitude, is amplified in an amplifier chain 105 and energizes, through a balanced Wheatstone bridge 106, a two-phase motor 107 whose controlled output shaft 108 is also connected with the discriminator 102 through the return shaft 104. The bridge comprises two impedances 109, 110, in a given ratio, forming a bridge ratio-arms. It further comprises two other arms, one of which consists in the motor 107 with the two two-phase windings 111 and 112 of its stator, the other arm being closed, in accordance with the invention, by a non-linear balancing network 113.

The amplifier supplies the bridge through one diagonal thereof; a voltage proportional to the counter-electromotive force appearing at the input terminals of the motor in motion is taken off the second bridge diagonal and re-applied in phase opposition through the return path 114 at one point in the amplifier chain 105.

Figure 2:
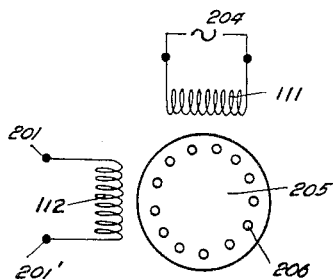
Fig. 2 is a diagrammatic view of a two-phase motor according to the invention.

In Fig. 2, the terminals of the motor 201 and 201' are connected to the output of the amplifier chain of a servo-mechanism and a stator winding 202 receives a constant frequency current (say 50 C. P. S.) with a variable amplitude. A second stator winding of the motor, 203, is connected with a source 204 having the same frequency, the latter winding passes a current with a constant amplitude. The rotor 205 of the motor together with its winding 206 are shown schematically in the figure.

Figure 3:
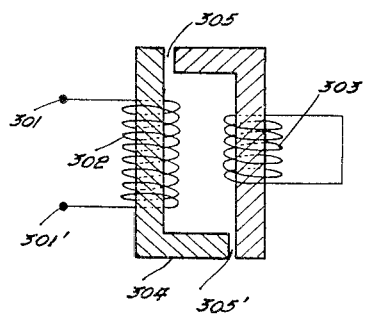
Fig. 3 is a diagrammatic view of a balancing network consisting of a transformer on an iron core and comprising a short-circuited secondary winding.

In Fig. 3 are shown the input terminals 301 and 301' of the balancing network, a primary winding 302 and a short-circuited secondary winding 303. The magnetic circuit 304 of the balancing network consists in two L-shaped magnetic stacks of stampings or laminations insulated from one another and separated by two air-gaps 305 and 305'.

On the balancing network shown in Fig. 3, the shape of the magnetic circuit has first been chosen arbitrarily. The latter consists in stacks of L-shaped magnetic laminations insulated from one another and assembled, by means of supports of any type, not shown, with two air gaps. The nature of the laminations used is approximately the same as that of the laminations in the magnetic circuit of the motor to be balanced, for instance silicon steel. The volume of the magnetic circuit of the balancing network is K times smaller than that of the motor, evaluated according to the rules of the art, K being the desired ratio between the impedance of the motor and that of the balancing network. Finally, the ratio of the length of the air gaps to the total length of the magnetic circuit is the same for the balancing network and for the motor. By these means, the inductions developed in the iron, when applying to the motor on the one hand and to the balancing network suitably wound as will be stated, on the other hand, voltages of variable amplitudes and with a ratio equal to K, are approximately the same, as well, consequently, as the non-linearity effects in the motor and balancing network when they are associated in a Wheatstone bridge with a ratio equal to K.

For determining the winding specifications for the two windings of the balancing network, the magnetic circuit of which has been determined as above, it is necessary to determine the effective resistance and inductance of the primary and secondary as well as the mutual inductance coefficient between them.

Using the motor specification, the inductance of the stator winding was calculated, and its effective resistance was measured. The characteristics of the primary winding of the balancing network were obtained by dividing the above by coefficient K, and a calculation was made, by the conventional method, in terms of the characteristics of the magnetic circuit already determined, of the winding specifications for its primary winding.

The characteristics of the short-circuited secondary winding were determined experimentally. It was assumed, and experience confirmed that the motor could be represented, effectively, as regards its apparent impedance, by a simple transformer with a short-circuited secondary. The apparent impedance of that transformer was calculated as a function of frequency, by the conventional method. The apparent impedance of the motor was measured at several frequencies, with a current small enough for the non-linearity effects due to the iron core to be negligible, and a calculation was made of the effective resistance, inductance and mutual inductance coefficient with the primary, of the secondary winding of the transformer, making it possible to obtain, taking into account the primary characteristics already known, the measured impedance values. After dividing these values by coefficient K, the winding specifications for the secondary winding were determined by the conventional method, as for the primary.

It may happen that the determination of the specifications for the windings, with the arbitrarily selected lamination design for the magnetic circuit, should lead to difficulties, for instance for obtaining the necessary mutual inductance coefficient. It is then sufficient to modify the magnetic circuit in which only the volume and air-gap have been determined. For example, the width of the L-shaped laminations may be changed, while increasing the thickness of the stacks for keeping the volume unaltered.

What I claim is:

1. In a servo-mechanism comprising a two phase motor having a rotor and stator, a pair of stator windings one of which is supplied by an error discriminator, a negative feedback amplifier including a feedback circuit, the torque of said motor reacting upon the discriminator, the feedback circuit of said amplifier comprising a Wheatstone bridge of a given arms ratio, one diagonal of which is supplied by said amplifier and the other diagonal of which is connected back to said amplifier, two arms of said Wheatstone bridge being constituted by one of the windings of said motor and by a balancing network respectively, the impedance of said network being in said ratio with the apparent impedance of said motor, said network providing across its terminals a non-linear apparent impedance which is a function of the intensity of the current which flows through it and reproduces in said ratio the non-linear apparent impedance of the motor.

2. A servo-mechanism as claimed in claim 1, in which said balancing network includes a transformer constituted by ferro-magnetic core stampings the composition of which is substantially the same as that of the stator and of the rotor of the motor and the ratio is equal to the ratio of the impedance of the windings of the motor stator and rotor windings, said core stampings including an air-gap having a width the ratio of which with respect to the total length of said core is equal to the ratio of the impedances of the windings of the stator of said motor, said transformer comprising a primary winding constituting the other arm of said Wheatstone bridge which is not constituted by the windings of said motor and a secondary winding which is wound on said ferro-magnetic core and short-circuited.

3. A servo-mechanism as claimed in claim 1, in which the ratio of the impedances forming the Wheatstone bridge is equal to one and in which the balancing network is formed by a motor similar to said first mentioned motor, said similar motor including a pair of stator windings, one of the stator windings of said last mentioned motor constituting one arm of said Wheatstone bridge.

4. A servo-mechanism as set forth in claim 1 in which said balancing network consists of an immobilized motor having a pair of windings one of which forms one of the arms of said Wheatstone bridge and the other of which is short-circuited upon itself.

5. A servo-mechanism as set forth in claim 1 in which said balancing network is formed by a transformer core having a pair of legs magnetically coupled to each other and a winding disposed on each of said legs, one of said windings being connected in one arm of said bridge and the other of said windings being shortcircuited upon itself.

6. A servo-mechanism as set forth in claim 1 in which said balancing network is formed by a transformer core consisting of stacks of L-shaped laminations assembled in mutualy coacting relation separated by magnetic air gaps therebetween and a winding on each of said stacks one of said windings being connected in one arm of said bridge and the other of said windings being shortcircuited upon itself.

References Cited in the file of this patent

UNITED STATES PATENTS

| 1,380,983 | Lee | June 7, 1921 |
| 2,429,257 | Bond | Oct. 21, 1947 |
| 2,508,082 | Wald | May 16, 1950 |
| 2,591,938 | Holliday | Apr. 8, 1952 |

OTHER REFERENCES

Abstract of application, S. N. 783,360 published November 21, 1950, 640 O. G. 1033.

Theory of Servomechanisms, James, Nichols and Phillips; McGraw-Hill Book Co., 1947, page 125.